United States Patent
Simon et al.

(10) Patent No.: US 8,787,660 B1
(45) Date of Patent: Jul. 22, 2014

(54) SYSTEM AND METHOD FOR PERFORMING AUTOMATIC FONT DEFINITION

(75) Inventors: Christian Simon, Laval (CA); Sylvain Chapleau, Laval (CA)

(73) Assignee: Matrox Electronic Systems, Ltd., Dorval, Quebec (CA)

( * ) Notice: Subject to any disclaimer, the term of this patent is extended or adjusted under 35 U.S.C. 154(b) by 690 days.

(21) Appl. No.: 11/286,707

(22) Filed: Nov. 23, 2005

(51) Int. Cl.
*G06K 9/62* (2006.01)
*G06K 9/34* (2006.01)
*G06K 9/18* (2006.01)
*G06K 9/46* (2006.01)
*G06T 11/00* (2006.01)
*G06K 15/02* (2006.01)

(52) U.S. Cl.
USPC .......... 382/161; 382/177; 382/182; 382/203; 345/468; 358/1.11

(58) Field of Classification Search
None
See application file for complete search history.

(56) References Cited

U.S. PATENT DOCUMENTS

| | | | | | |
|---|---|---|---|---|---|
| 3,737,855 | A | * | 6/1973 | Cutaia | 382/272 |
| 5,048,096 | A | * | 9/1991 | Beato | 382/176 |
| 5,327,342 | A | * | 7/1994 | Roy | 345/467 |
| 5,594,809 | A | * | 1/1997 | Kopec et al. | 382/161 |
| 5,892,843 | A | * | 4/1999 | Zhou et al. | 382/176 |
| 6,038,342 | A | * | 3/2000 | Bernzott et al. | 382/173 |
| 6,272,238 | B1 | * | 8/2001 | Kugai | 382/165 |
| 6,337,924 | B1 | * | 1/2002 | Smith | 382/190 |
| 7,064,757 | B1 | * | 6/2006 | Opstad et al. | 345/467 |
| 2002/0181779 | A1 | * | 12/2002 | Hansen | 382/209 |
| 2003/0035580 | A1 | * | 2/2003 | Wang et al. | 382/176 |
| 2005/0122327 | A1 | * | 6/2005 | Greve | 345/467 |
| 2006/0045386 | A1 | * | 3/2006 | Fukuoka et al. | 382/305 |
| 2006/0050962 | A1 | * | 3/2006 | Geiger et al. | 382/186 |
| 2006/0269137 | A1 | * | 11/2006 | Evans | 382/182 |
| 2006/0269138 | A1 | * | 11/2006 | Williamson et al. | 382/186 |

OTHER PUBLICATIONS

Brunelli and Poggio, "Face Recogntion: Features versus Templates", IEEE Transactions on Pattern Analysis and Machine Intelligence, vol. 15 No. 10, Oct. 1993.*

* cited by examiner

*Primary Examiner* — Randolph I Chu
*Assistant Examiner* — Nathan Bloom
(74) *Attorney, Agent, or Firm* — Foley & Lardner LLP

(57) ABSTRACT

A method of defining model characters of a font. The method includes receiving a string of characters, receiving an image that includes an occurrence of the string, identifying objects in the image, determining, for each respective object, which of the objects satisfies first criteria indicating that the respective object likely corresponds to a character in the string, determining, for each respective object satisfying the first criteria, which of the objects satisfies second criteria indicating that the respective object belongs to a sequence of objects likely to correspond to the string, and defining, for each respective object satisfying the second criteria, a model character for each character of the string based upon a corresponding object of the sequence of objects. The first criteria may include aspect ratio criterion, size criterion, or both, and the second criteria may include alignment criterion, spacing criterion contrast criterion, encompassment criterion, or combinations thereof.

23 Claims, 7 Drawing Sheets

Font definition

User string: AIML

Font definition

Character     Model character

M

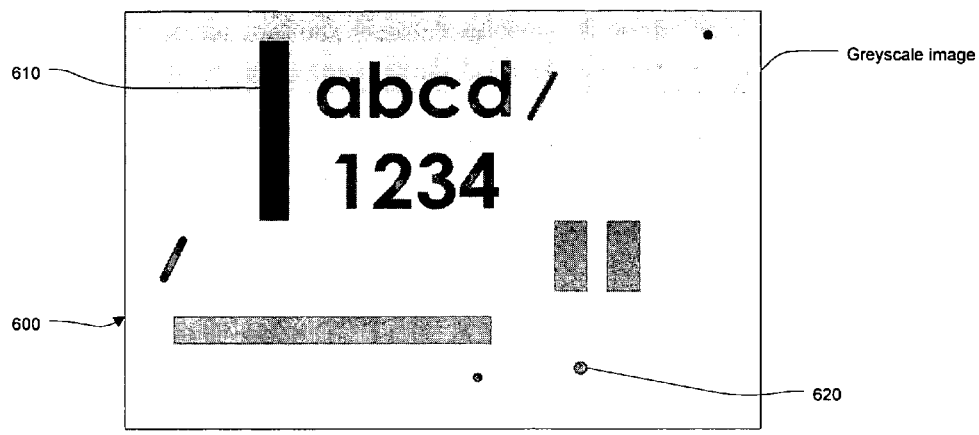
Fig. 6
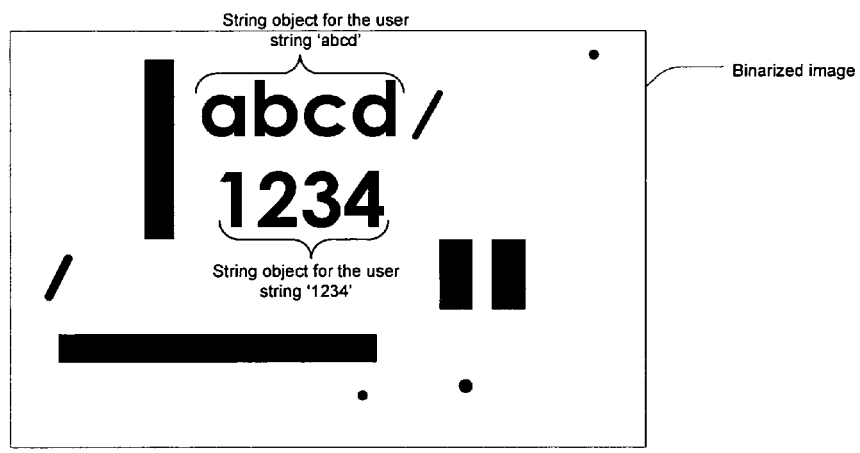
Fig. 7
Fig. 8

SYSTEM AND METHOD FOR PERFORMING AUTOMATIC FONT DEFINITION

BACKGROUND

1. Field of the Invention

Aspects of the present invention are directed to defining model characters of a font, and more particularly, to a system and method for automatically defining model characters of a font that may be used, for example, in optical character recognition.

2. Discussion of the Related Art

Font-based Optical Character Recognition (OCR) systems perform OCR on an image with respect to a specific font.

A font is composed of a set of characters (e.g., ASCII values) and a corresponding set of model characters. A model character is a representation of the corresponding character, such as a grayscale or binary image of the character, that may be used during a subsequent recognition process. Rather than an image of the character, a model character may alternatively be defined as a set of features extracted from an image of the character, or a mathematical description of the character. During the subsequent character recognition process, an unknown character in an image is compared with each of the model characters of the selected font, and the character corresponding to the best match is returned.

In many instances, model characters may be generated based upon a font to which a user has access. For example, certain conventional systems permit the user to define a font for OCR directly from a "system font." The user simply provides (1) a reference to a font defined on his/her operating system (e.g., a TrueType, PostScript, or Bitmap font), (2) the set of characters for which model characters are to be defined, and (3) the desired point size of the model characters. A model character may then be automatically generated for each of the requested characters from the corresponding system font character.

However, in certain instances, users may not have access to a "system font" for the font they want to read via OCR. For example, a user may wish to utilize OCR to recognize vehicle license plate numbers, or perhaps, to recognize the serial numbers, etc. on parts in an automated manufacturing environment. In such applications, the fonts that were used to form the characters may not be readily or conveniently available, or may be specific to specific governments or part manufacturers. In such instances, the user must resort to defining the fonts "manually."

In certain OCR systems, a user may manually define a font by providing a sample image (grayscale or binary) of each character of the font. The user may either provide an image of the character (exclusively) or may provide a more complex image containing a character (potentially in combination with other characters or image data) and a region of interest (ROI) outlining the bounding box of the character. It should be appreciated that defining a region of interest (ROI) in an image is impractical, unless a Graphical User Interface is available offering such functionality.

It should be appreciated that model definition is a critical step of the OCR process: if model characters are poorly defined, the performance of the OCR system will suffer. Accordingly, the user must define each model character with care.

Defining each model character one at a time is very time-consuming and tedious, particularly when the font contains a large set of characters: uppercase and lowercase characters, numerals, marked characters (containing dots, accents, etc.), punctuation, etc.

To accelerate the model definition process, schemes have been proposed that define several model characters at once. For example, a prior OCR module provided the following method of font definition described with respect to FIGS. 1-3B. As illustrated in FIG. 1, the method receives for input (1) a string of characters 110 (e.g., an ASCII string) typically provided by the user and denoted "User String" in FIG. 1, (2) an image 120 containing an occurrence of the string in its top-left corner, and (3) the width w and height h of a rectangle 130 (e.g., bounding box) bounding a character, which was assumed to be the same for each character of the string. As illustrated in FIGS. 2A and 2B, the method defines a model character 210 for the $i^{th}$ character of the string as the portion of the image bounded by the rectangle having corners:

$$[(i-1)w,0][iw,0][(i-1)w,h][iw,h]$$

This method assumes that all characters have equal width, which is not the case for all fonts. For example, in proportional-width fonts, such as illustrated in FIG. 3A, different characters (for example, uppercase "I") have different widths than other characters (for example, uppercase "M"). FIG. 3B illustrates what happens when the method described above is applied to a proportional font.

SUMMARY OF THE INVENTION

According to one aspect of the present invention, a method of defining model characters of a font is provided. The method comprising acts of receiving a string of characters, receiving an image includes an occurrence of the string of characters, identifying objects in the image, identifying a sequence of objects corresponding to the string of characters based upon a comparison of at least one feature value of each object of the sequence of objects and a range of feature values associated with a corresponding character of the string, and defining a model character for each character of the string of characters based upon the corresponding object of the sequence of objects. In accordance with one embodiment of the present invention, the at least one feature value is indicative of an aspect ratio of the object.

In accordance with another embodiment of the present invention, the act of identifying the sequence of objects further includes an act of determining whether each object of the sequence of objects satisfies at least one string criteria including an alignment criterion that identifies a degree to which objects of the sequence of objects are aligned, a spacing criterion that identifies a degree to which pair of objects of the sequence of objects are spaced apart, contrast criterion that identifies a degree to which each object of the sequence of objects corresponds to a median contrast of the sequence of objects, and non-encompassment criterion that identifies whether a first object of the sequence of objects encompasses a next object of the sequence of objects. In a further embodiment, the at least one string criteria includes the alignment criterion and at least one of the spacing criterion, the contrast criterion, and the non-encompassment criterion.

According to another aspect of the present invention, a computer readable medium is provided. The computer readable medium is encoded with a plurality of instructions, that when executed by at least one processor, implements a method of defining model characters of a font comprising acts of receiving a string of characters, receiving an image includes an occurrence of the string of characters, identifying objects in the image, identifying a sequence of objects corresponding to the string of characters based upon a comparison of at least one feature value of each object of the sequence of objects and a range of feature values associated with a corresponding character of the string, and defining a model character for each character of the string of characters based upon the corresponding object of the sequence of objects.

In accordance with another aspect of the present invention, a method of defining model characters of a font is provided. The method comprises acts of receiving a string of characters, receiving an image that includes an occurrence of the string of characters, identifying objects in the image, determining, for each respective object in the image, which of the objects in the image satisfies at least one first criteria indicating that the respective object is likely to correspond to a character in the string of characters, determining, for each respective object satisfying the at least one first criteria, which of the objects in the image satisfies at least one second criteria indicating that the respective object belongs to a sequence of objects that is likely to correspond to the string of characters, and defining, for each respective object satisfying the at least one second criteria, a model character for each character of the string of characters based upon a corresponding object of the sequence of objects.

In accordance with one embodiment, the at least one first criteria includes at least one of aspect ratio criterion identifying whether the respect object in the image corresponds to a range of permissible aspect ratios for a character in the string of characters and a size criterion identifying whether the respective object in the image corresponds to a range of permissible sizes of characters that fit within the image based upon a size of the image and a number of characters in the string of characters. In accordance with another embodiment, the at least one second criteria includes at least one of alignment criterion identifying a degree to which each respective object in the sequence of objects is aligned with other objects in the sequence of objects, spacing criterion identifying a degree to which adjacent pairs of objects in the sequence of objects are spaced apart, contrast criterion identifying a degree to which each respective object in the sequence of objects correspond to a median contrast of the sequence of objects, and encompassment criterion identifying whether one object in the sequence of objects encompasses another object in the sequence of objects. In yet a further embodiment, the at least one first criteria includes both the aspect ratio criterion and the size criterion, and the at least one second criteria includes the alignment criterion and at least one of the spacing criterion, the contrast criterion and the encompassment criterion.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIG. 6 illustrates a grayscale image that contains an occurrence of a user string upon which model definition may be performed;

FIG. 7 illustrates a binarized depiction of the image of FIG. 6 in which pixels of the image have been set to one of two values;

FIG. 8 depicts a set of model characters defined based upon the image illustrated in FIG. 6 and user strings;

DETAILED DESCRIPTION

Figure 1:
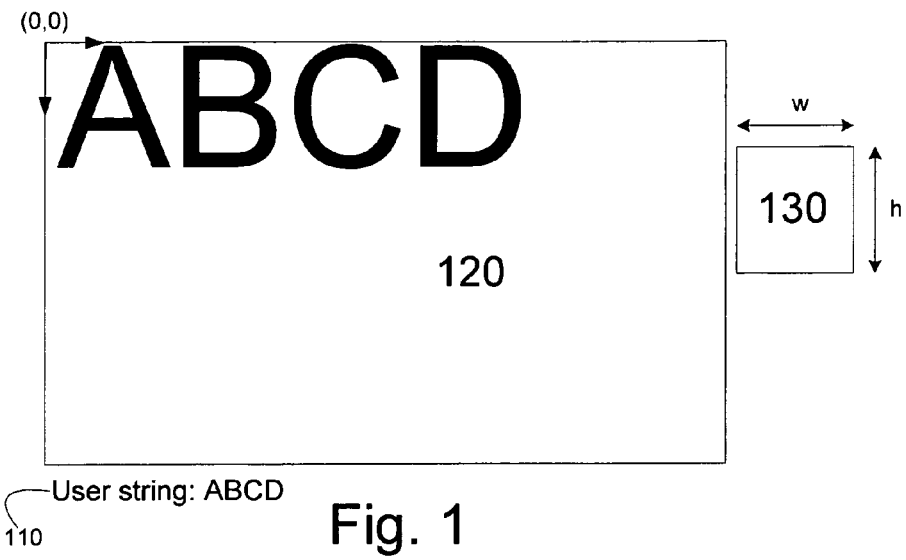
FIG. 1 illustrates a user string of characters and an associated image to be processed in accordance with a conventional font definition scheme.
Figure 2A:
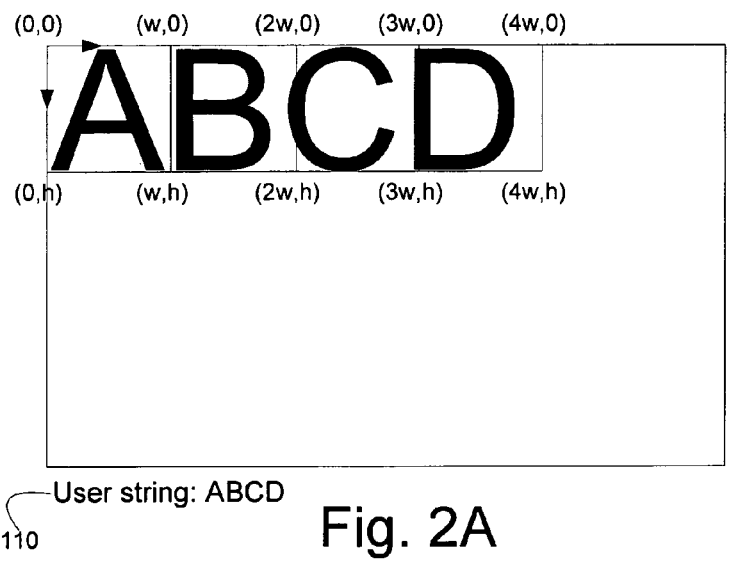
FIGS. 2A and 2B illustrate the manner in which model characters are defined in a conventional font definition scheme based upon the user string and image of FIG. 1.
Figure 2B:
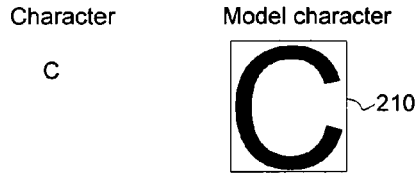

Various embodiments and aspects thereof will now be described in more detail with reference to the accompanying figures. It is to be appreciated that this invention is not limited in its application to the details of construction and the arrangement of components set forth in the following description or illustrated in the drawings. The invention is capable of other embodiments and of being practiced or of being carried out in various ways. Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

In broad overview, and in accordance with the present invention, the font definition routine receives two inputs; namely one or more user strings that include a sequence of one or more characters, and an image that includes an occurrence of the one or more user strings. Where multiple user strings are provided, the user also provides the order in which they appear in the image (e.g., from top to bottom, left to right), or an order may be inferred. During execution of the routine, the routine determines which objects in the image most closely correspond to the one or more received user strings, and then defines one or more model characters corresponding to the characters of the one or more received user strings. The model characters thus defined may then form the basis for a subsequent OCR process.

In slightly more detail, during execution of the routine, a binary version of the image is generated and image objects are isolated. Isolated image objects are then examined based upon first criteria to determine which of the isolated image object are likely to correspond to a character object. Criteria used to determine whether an image object is a character object rather than another type of object (e.g., a graphical object) may include size criterion (e.g., maximum height or width, minimum height or width, etc.), aspect ratio criterion, or any other criteria permitting a determination that an image object satisfying that criteria is more likely to be a character object than another type of object. The character objects are then examined based upon second criteria to determine whether a grouping of one or more character objects corresponds to a candidate string object that is a possible occurrence of the one or more received user strings. An example of string objects in an image is illustrated in FIG. 7 for the string objects "abcd" and "1234," although other objects are present as well.

Criteria used to determine whether one or more character objects is a candidate string object may include alignment criterion, contrast criterion, character spacing criterion, as well as other criteria. Candidate string objects are then examined based upon third criteria to determine which of the candidate string objects most corresponds to the one or more received user strings. In the case where only a single user string is provided, the third criteria may include the number of character objects in the candidate string object, aspect ratio and size information pertaining to character objects in the candidate string object, etc. Where multiple user strings were received, the third criteria may also include information pertaining to the order in which the user strings were provided. Where more than one candidate string object satisfies the criteria for the received user string or strings, fourth criteria may be applied to select the best match. Based upon the best match, model characters may then be defined, such that the $i^{th}$ character of the user string corresponds to the $i^{th}$ character of the selected candidate string object.

As will be described in more detail below, embodiments of the present invention provide a number of advantages over conventional systems and methods of font definition. For example, embodiments of the present invention may be automatic as well as being parameter-less. In this regard, other than providing the image, string(s), and their order (if there are multiple strings), embodiments of the present invention require no other intervention from the user. Thus, for example, the user is not required to enter parameters such as maximum and minimum dimensions for characters, identify regions of an image, etc.

Further, embodiments of the present invention are intelligent and flexible. The font definition routines of the present invention may be used to define model characters from "complex images," such as images containing various objects, such as graphical objects or even scanning artifacts in addition to the character objects. Moreover, embodiments of the present invention need not be provided with information such as the size of the character objects in the image, and thus, their size may vary from image to image.

In accordance with one embodiment, a model character is only defined if a series of strict criteria are satisfied; if not satisfied, a failure notice may be returned. This embodiment thus provides a robust implementation having a low error rate, such that it rarely defines model characters incorrectly, and rarely generates so-called "false positives" or "false matches." Moreover, embodiments of the present invention may be used to define model characters from images with any level of contrast, and from multi-contrast images (i.e., images in which the contrast level varies across the image). In one embodiment, this contrast invariance is achieved by applying a local binarization technique, followed by filtering techniques that apply a series of strict criteria to filter out irrelevant image objects.

Figure 4:
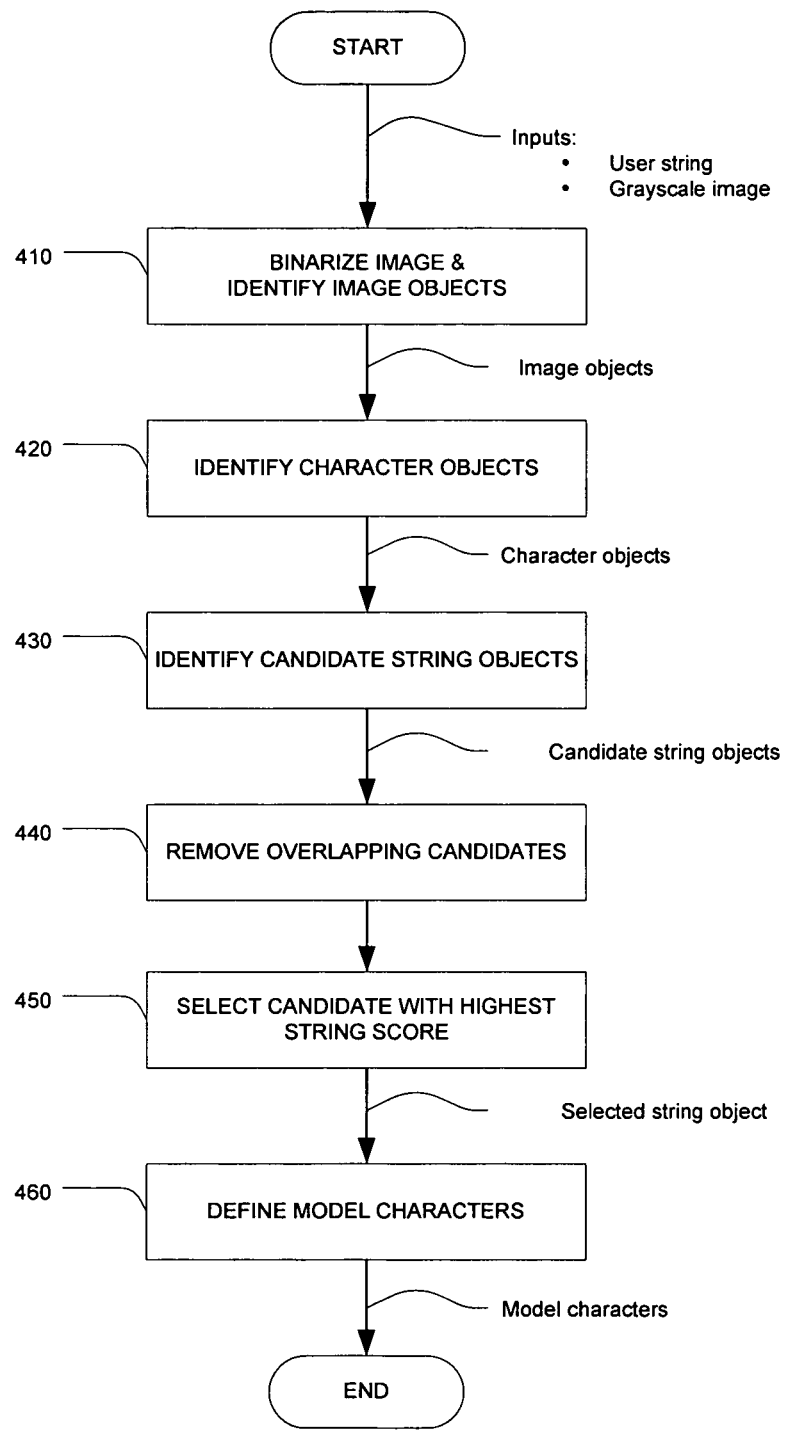
FIG. 4 illustrates a font definition routine in accordance with one embodiment of the present invention.

FIG. 4 illustrates a font definition routine in accordance with one embodiment of the present invention. Although the font definition routine depicted in FIG. 4 is specifically directed to a font definition routine that accepts a single user string and an image containing an occurrence of that user string and defines a font based upon that single user string and the image, many of the acts that are performed by this routine are similar to the routine described below with respect to FIG. 5 for multiple user strings.

As used herein, the term "user string" is defined to mean a sequence of one or more characters that is received as one of the inputs to the routine. In most instances, the user string is received by the routine based upon input provided by a human user, for example, by use of a keyboard operatively connected to a computer system upon which the routine is executed.

The computer system may be, for example, a general-purpose computer such as those based on an Intel PENTIUM®-type processor, a Motorola PowerPC® processor, a Sun UltraSPARC® processor, a Hewlett-Packard PA-RISC® processor, or any other type of processor. Such a computer system generally includes a processor connected to one or more memory devices, such as a disk drive memory, a RAM memory, or other device for storing data. The memory is typically used for storing programs and data during operation of the computer system. Software, including programming code that implements embodiments of the present invention, is generally stored on a computer readable and/or writeable nonvolatile recording medium and then copied into memory wherein it is then executed by the processor. Such programming code may be written in any of a plurality of programming languages, for example, Java, Visual Basic, C, C#, or C++, Fortran, Pascal, Eiffel, Basic, COBAL, or any of a variety of combinations thereof.

Although embodiments of the present invention are described with respect to receiving input from a user of the computer system, it should be appreciated that embodiments of the present invention are not limited to receipt of the user string directly from a human that interacts locally with the computer system, as other methods of acquiring a user string as input may alternatively be used.

In act 410 the font definition routine receives, as input, a user string and an image 600 containing an occurrence of the user string, such for example, as illustrated in FIG. 6. In general, the image containing the occurrence of the user string will typically be a grayscale image such as the image depicted in FIG. 6, and will often include other information, such as graphical elements 610, artifacts 620 related to the scanning process, or other elements that do not correspond to the characters of the user string for which font definition is desired. Although embodiments of the present invention are described primarily with respect to defining a font for a user string based upon a grayscale image containing an occurrence of the user string, it should be appreciated that the present invention is not so limited, as other types of images, for example, binary images or color images, may be used instead, and as discussed in more detail below.

In act 410 the font definition routine binarizes the received image and identifies image objects contained in the image. Where the received image is a grayscale image (or indeed, even a full color image), the image may be binarized via any one of a variety of thresholding techniques known to those skilled in the art, where, for example, each pixel of the grayscale image is processed and set to one of two values according to whether it is above, or below a threshold value. The act of binarizing the image according to a threshold is used to distinguish foreground pixels from background pixels. Then, connected foreground pixels are identified and grouped into so-called "blobs," which are termed "image objects" herein.

In one embodiment, a local as opposed to global thresholding technique is applied. In global thresholding techniques, the same threshold value is applied to the whole image. This threshold value may be a constant value, or may be determined adaptively for each input image, as known by those skilled in the art. For example the threshold value may be adaptively determined as the average pixel value of the image or the pixel value at the middle of the dynamic range of the image, where the dynamic range of the image is based upon the minimum pixel value in the image and the maximum pixel value in the image. Although global thresholding techniques may be used in accordance with the present invention, such techniques may fail to adequately detect image objects appearing at different contrast levels. Accordingly, in one embodiment, local thresholding techniques are used in act 410 to binarize the image to help ensure that all image objects will be capable of being located, regardless of the contrast complexity of the image. Although such local thresholding techniques may result in generating spurious image objects (for example, due to artifacts of the scanning process), such spurious objects may be filtered out by applying a series of criteria as described in more detail below.

In act 410 local thresholding is applied to each pixel of the image to binarize the image, such that for each pixel of the image, a unique threshold value is determined based on the pixel values in a neighborhood (or window) around the pixel, and the pixel is binarized according to this threshold value. In one embodiment, the threshold value is the average pixel value in the neighborhood of the current pixel being processed, although alternatively, the threshold value may be selected to be the middle of the dynamic range of the neighborhood, for example.

After the received image is binarized according to either local or global thresholding techniques, connected foreground pixels having the same value are then grouped into "blobs" and denoted image objects. It should be appreciated that where the received image is already in binary form (e.g., is a binary image), the act of binarizing would not be necessary, and act 410 may include only an act of identifying image objects by recognizing interconnected pixels having the same value. FIG. 7 illustrates an exemplary binarized depiction of the image previously depicted in FIG. 6.

In act 420, the font definition routine identifies character objects based upon the image objects it identified in act 410. As used herein, the term "character object" is defined to mean an image object that satisfies certain criteria relating to characters rather than other types of image objects (e.g., graphical objects, etc.); that is, satisfies one or more criteria that indicate the image object is more likely to be a character rather than another type of image object. Criteria that may be used to identify which image objects are likely to be characters may include size criterion including maximum and minimum dimensions, "characterness" criterion, aspect ratio criterion, etc.

For example, in act 420, image objects may be discarded if their dimensions are outside the range of allowable dimensions for a character object. It should be appreciated that since the size of the characters of the input image is generally not known and can vary from one image to the next, the size criteria should be sufficiently flexible to encompass ranges (maximum and minimum) that could be expected to be found in the input image. Although the user could be prompted to provide specifics relating to the size of characters in the input image, embodiments of the present invention do not require the user to set the maximum or minimum dimensions of a character, and thus are parameter-less. Indeed, in accordance with an embodiment of the present invention, the criteria used to determine allowable dimensions of a character is automatic and adaptive, such that the maximum and minimum dimensions of a character object are "custom-determined" for each input image/user string pair.

As will be described in detail more fully below, a string object is formed from a set of character objects that are generally aligned (amongst other criteria) along a scan or processing direction of the image (e.g., aligned horizontally generally around a point on the Y axis, although character objects could alternatively be aligned vertically generally around a point on the X axis). Accordingly, and assuming the character objects are aligned horizontally (e.g., around a point on the Y axis) a maximum allowable width for a character object may be determined based upon the number of characters in the user string and the width of the image.

For example, if it is first assumed that a string object is composed of character objects of equal width, the maximum allowable width, $W_{max}$, may be determined as:

$$W_{max} = W_{im}/N \quad \text{(Eq. 1)}$$

where $W_{im}$ is the width of the image and N is the number of characters in the user string. Any image object larger than $W_{max}$ would therefore be discarded because a string object comprising N such character objects would not fit in the image.

Figure 3A:
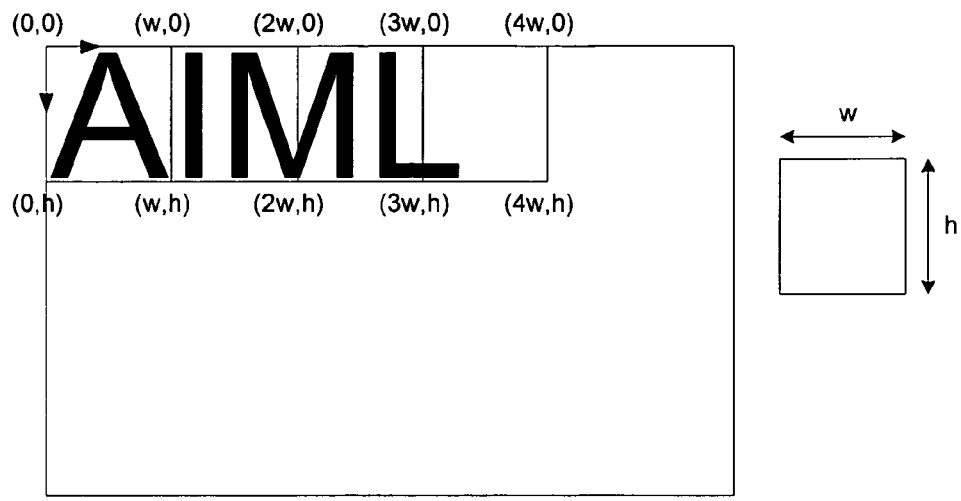
FIGS. 3A and 3B illustrate a limitation of a conventional font definition scheme when processing proportional font characters.
Figure 3B:
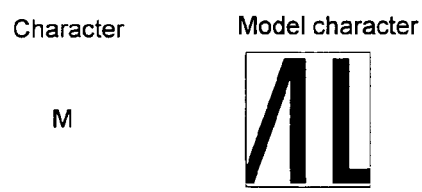

Often, character objects do not have equal width (see, for example, FIGS. 3a and 3b), so a maximum allowable width determined based upon the above relationship may be too discriminatory. Accordingly, in one embodiment, the maximum allowable width $W_{max}$ is determined in accordance with the following equation:

$$W_{im} = W_{max} + (N-1)\frac{W_{max}}{k} \quad \text{(Eq. 2)}$$

which, upon reorganization becomes:

$$W_{max} = W_{im}k/(k+N-1) \quad \text{(Eq. 3)}$$

where k is a constant value. This $W_{max}$ is less discriminatory and accounts for the varying widths of character objects within a string object. Although in one embodiment there is no maximum allowable height for a character object, the maximum allowable height may alternatively be specified and used as a criterion. For example, the maximum allowable height could be set to the height of the image for user strings dealing with the modern Latin alphabet, or to some lesser value where either multiple input user strings are received, or where the input user string may be expected to correspond to a non-Latin alphabet that is oriented vertically, for example.

Another type of size criteria used to determine whether an image object may be a character object is the minimum dimensions of the image object. In one embodiment, a first pair of minimum dimensions ($w_{min1}$, $h_{min1}$) is applied to the image objects, and any image object whose width is smaller than $w_{min1}$ and whose height is smaller than $h_{min1}$ is discarded. As an example, the minimum width and height dimensions may be set to a specified number of pixels based upon the number of pixels forming the images. This number may, for example, be set to a specific value in advance of execution of the font definition routine and be the same for each image provided to the routine, or alternatively, may be adaptively determined based upon the image provided to the routine. For example, the minimum width and height dimensions may be set to some predetermined percentage of the width and height of the image (for example, 1%), such that the minimum width and height dimensions may vary from image to image based upon the size of the image. Alternatively still, the minimum width and height dimensions may be set to some predetermined percentage of the width and height of the image, and the number of image objects in the image. It should be appreciated that if, after applying remaining criteria (i.e., maximum dimensions, aspect ratio, characterness, etc.) the number of image objects remaining is above a threshold, a second and more discriminatory pair of minimum dimensions ($w_{min2}$, $h_{min2}$) may be applied. Thus, the minimum dimensions for a character object may be adaptively determined based upon the complexity of the input image.

In addition to size criterion, the criteria applied in act 410 to identify whether an image object is a character object may also include "characterness" criterion and aspect ratio criterion. Characterness criterion may include, for example, the number of holes within an image object, or other indicia characteristic of characters as opposed to other types of image objects. For example, an image object may be discarded if it contains a number of "holes" that is larger than an allowable threshold, where a hole is identified by a group of connected background pixels completely surrounded by a group of connected foreground pixels. It should be appreciated that although the allowable hole threshold may vary by alphabet, in most alphabets, such as for example the modern Latin alphabet, the characters include only a limited number of holes.

Aspect ratio criterion may also be applied that is based upon the allowable aspect ratios (the ratio of the height of a character object relative to the width of the character object) for a character object. In one embodiment of the present invention, the allowable aspect ratio may be based, at least in part, by considering the particular characters present in the user string. For example, assuming that it is desired to define fonts for a specific alphabet, such as the modern day "Latin" alphabet, certain assumptions may be made about the shape of character occurrences which intelligently distinguishes character occurrences from other image objects. In one embodiment, the font definition routine refers to a database containing various characteristics relating to characters of the modern day Latin alphabet that are determined by observing characters across fonts, e.g., aspect ratio and size relative to other characters of the alphabet. It should be appreciated that for a robust implementation, various databases may be used containing characteristics of other alphabets, such as Greek, Cyrillic, etc.

In this database, each character a of the alphabet has an associated range $[A_{min}(a), A_{max}(a)]$ that defines the minimum and maximum allowable aspect ratios for character a. An image object whose aspect ratio does not belong to the range $[A_{min}(a), A_{max}(a)]$ cannot be an occurrence of character a.

Thus, in act 420, a range $[A_{min}, A_{max}]$ of allowable aspect ratios for an image object to be an occurrence of a character of the user string is determined based on the range $[A_{min}(a), A_{max}(a)]$ of each character a of the user string. This range may be expressed as:

$$A_{min} = \min_{\forall a \in string} \{A_{min}(a)\} \quad \text{(Eq. 5a)}$$

$$A_{max} = \max_{\forall a \in string} \{A_{max}(a)\} \quad \text{(Eq. 5b)}$$

An image object whose aspect ratio does not belong to the range $[A_{min}, A_{max}]$ cannot be a character of the user string and is therefore discarded.

It should be appreciated that the determination of allowable aspect ratios may be further refined, based upon the received user string, to sub-divide the range of allowable aspect ratios according to the class of character. For example, the class of allowable aspect ratios may be sub-divided into a first class containing narrow-width characters (e.g., 1, I, and !), a second class containing large-width uppercase characters (e.g., W and M), a third class containing large-width lowercase characters (e.g., w and m), etc. Each of the sub-divided classes, denoted class C, may have an associated range $[A_{min}(C), A_{max}(C)]$ that defines the minimum and maximum aspect ratios allowed for that class. An object whose aspect ratio does not belong to the range $[A_{min}(C), A_{max}(C)]$ cannot be a character of class C. Thus, the range $[A_{min}(a), A_{max}(a)]$ of a character may be equal to the range of the class to which it belongs.

In one embodiment, characters 33-127 (Decimal) of the ASCII character set (see Table I) are supported "optimally"; these characters are divided into classes such as described above according to their aspect ratio, relative size etc. However, it should be appreciated that model characters may be defined for characters not belonging to this character set, and these characters may be classified into an "unknown" class having much broader characteristics.

TABLE 1

| Ctrl | Dec | Hex | Char | Code |
|---|---|---|---|---|
| ^@ | 0 | 00 | | NUL |
| ^A | 1 | 01 | | SOH |
| ^B | 2 | 02 | | STX |
| ^C | 3 | 03 | | ETX |
| ^D | 4 | 04 | | EOT |
| ^E | 5 | 05 | | ENQ |
| ^F | 6 | 06 | | ACK |
| ^G | 7 | 07 | | BEL |
| ^H | 8 | 08 | | BS |
| ^I | 9 | 09 | | HT |
| ^J | 10 | 0A | | LF |
| ^K | 11 | 0B | | VT |
| ^L | 12 | 0C | | FF |
| ^M | 13 | 0D | | CR |
| ^N | 14 | 0E | | SO |
| ^O | 15 | 0F | | SI |
| ^P | 16 | 10 | | DLE |
| ^Q | 17 | 11 | | DC1 |
| ^R | 18 | 12 | | DC2 |
| ^S | 19 | 13 | | DC3 |
| ^T | 20 | 14 | | DC4 |
| ^U | 21 | 15 | | NAK |
| ^V | 22 | 16 | | SYN |
| ^W | 23 | 17 | | ETB |
| ^X | 24 | 18 | | CAN |
| ^Y | 25 | 19 | | EM |
| ^Z | 26 | 1A | | SUB |
| ^[ | 27 | 1B | | ESC |
| ^\ | 28 | 1C | | FS |
| ^] | 29 | 1D | | GS |
| ^^ | 30 | 1E | ▲ | RS |
| ^_ | 31 | 1F | ▼ | US |
| | 32 | 20 | | |
| | 33 | 21 | ! | |
| | 34 | 22 | " | |
| | 35 | 23 | # | |
| | 36 | 24 | $ | |
| | 37 | 25 | % | |
| | 38 | 26 | & | |
| | 39 | 27 | ' | |
| | 40 | 28 | ( | |
| | 41 | 29 | ) | |
| | 42 | 2A | * | |
| | 43 | 2B | + | |
| | 44 | 2C | , | |
| | 45 | 2D | - | |
| | 46 | 2E | . | |
| | 47 | 2F | / | |
| | 48 | 30 | 0 | |
| | 49 | 31 | 1 | |
| | 50 | 32 | 2 | |
| | 51 | 33 | 3 | |
| | 52 | 34 | 4 | |
| | 53 | 35 | 5 | |
| | 54 | 36 | 6 | |
| | 55 | 37 | 7 | |
| | 56 | 38 | 8 | |
| | 57 | 39 | 9 | |
| | 58 | 3A | : | |
| | 59 | 3B | ; | |
| | 60 | 3C | < | |
| | 61 | 3D | = | |

TABLE 1-continued

| Ctrl | Dec | Hex | Char | Code |
|---|---|---|---|---|
| | 62 | 3E | > | |
| | 63 | 3F | ? | |
| | 64 | 40 | @ | |
| | 65 | 41 | A | |
| | 66 | 42 | B | |
| | 67 | 43 | C | |
| | 68 | 44 | D | |
| | 69 | 45 | E | |
| | 70 | 46 | F | |
| | 71 | 47 | G | |
| | 72 | 48 | H | |
| | 73 | 49 | I | |
| | 74 | 4A | J | |
| | 75 | 4B | K | |
| | 76 | 4C | L | |
| | 77 | 4D | H | |
| | 78 | 4E | N | |
| | 79 | 4F | O | |
| | 80 | 50 | P | |
| | 81 | 51 | Q | |
| | 82 | 52 | R | |
| | 83 | 53 | S | |
| | 84 | 54 | T | |
| | 85 | 55 | U | |
| | 86 | 56 | V | |
| | 87 | 57 | W | |
| | 88 | 58 | X | |
| | 89 | 59 | Y | |
| | 90 | 5A | Z | |
| | 91 | 5B | [ | |
| | 92 | 5C | \ | |
| | 93 | 5D | ] | |
| | 94 | 5E | ^ | |
| | 95 | 5F | _ | |
| | 96 | 60 | ` | |
| | 97 | 61 | a | |
| | 98 | 62 | b | |
| | 99 | 63 | c | |
| | 100 | 64 | d | |
| | 101 | 65 | e | |
| | 102 | 66 | f | |
| | 103 | 67 | g | |
| | 104 | 68 | h | |
| | 105 | 69 | i | |
| | 106 | 6A | j | |
| | 107 | 6B | k | |
| | 108 | 6C | l | |
| | 109 | 6D | m | |
| | 110 | 6E | n | |
| | 111 | 6F | o | |
| | 112 | 70 | p | |
| | 113 | 71 | q | |
| | 114 | 72 | r | |
| | 115 | 73 | s | |
| | 116 | 74 | t | |
| | 117 | 75 | u | |
| | 118 | 76 | v | |
| | 119 | 77 | w | |
| | 120 | 78 | x | |
| | 121 | 79 | y | |
| | 122 | 7A | z | |
| | 123 | 7B | { | |
| | 124 | 7C | \| | |
| | 125 | 7D | } | |
| | 126 | 7E | ~ | |
| | 127 | 7F | ◊* | |

*ASCII code 127 has the code DEL. Under MS-DOS, this code has the same effect as ASCII 8 (BS). The DEL code can be generated by the CTRL + BKSP key.

In act 430, candidate string objects are identified based upon the character objects identified previously in act 420. As used herein, the term "string object" refers to a sequence of one or more character objects that satisfy certain string criteria, and the term "candidate string object" refers to a string object that satisfies criteria specific to the particular user string. Criteria that may used to identify a string object may include the following general string criteria, such as alignment criterion (e.g., whether the character objects meet certain criteria relating to alignment of the character objects), contrast criterion (e.g., whether the character objects have compatible contrast values), thickness criterion (e.g., whether the character objects have compatible thickness (e.g., stroke width) values, non-encompassment criterion (e.g., whether, and potentially by what degree, the character objects encompass one another), and inter-character spacing criterion (e.g., whether, and potentially to what degree the character objects are spaced apart from one another), as described in detail more fully below. In the embodiment described with respect to FIG. 4 in which a single user string is provided, in addition to meeting one or more of the string object criteria described above, the identification of candidate strings in act 430 also includes criteria related to the particular user string received by the font definition routine. This candidate string criteria may include whether the number of character objects in a string object includes at least as many characters as the user string, whether the aspect ratio of the character objects within the user string correspond to permissible aspect ratios of respective characters of the user string, and whether the size of the character objects in the string object are consistent with the respective characters of the user string.

Figure 9:
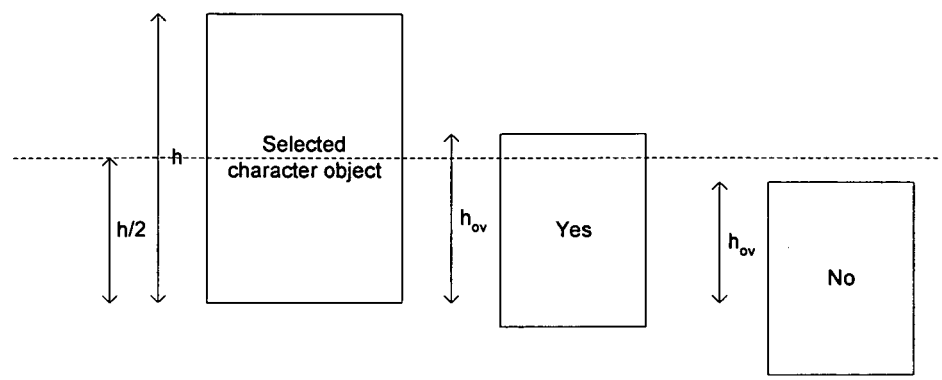
FIG. 9 illustrates the manner in which alignment criteria may be applied in accordance with embodiments of the present invention.

In accordance with one embodiment, whether a sequence of one or more character objects meets the alignment criterion and is thus a potential candidate string object is determined in the following manner. During processing, the first (i.e., the left-most) character object of the potential candidate string object is used as a reference object. The alignment criterion is satisfied if each of the remaining character objects is "aligned" with the reference object, two character objects being aligned if their ordinate ranges (y-projections) overlap and if the height $h_{ov}$ of the overlap is greater than half the height h of the taller of the two character objects, as illustrated in FIG. 9. In one implementation, the alignment criterion includes exception conditions to handle user strings that contain punctuation, for example.

Whether a sequence of one or more character objects meets contrast criterion may be determined in the following manner. In one embodiment, and assuming that the image received in act 410 was a grayscale image, a pixel of the grayscale image is denoted as either a foreground pixel or a background pixel according to how it was binarized (at step 410 of FIG. 4). In this embodiment, the contrast $C_{ch\_obj}$ of a character object may be defined as the difference between the average foreground pixel value and the average background pixel value inside the bounding box of the character object.

The compatibility between the contrasts of the character objects may be determined as follows. The contrast $C_{ch\_obj}$ of each of the character objects and, then, the median contrast $C_{med}$ are determined. The contrast criterion is satisfied if, for each of the character objects forming the potential candidate string object, the contrast of the character object differs from the median contrast by less than a given threshold, i.e.

$$\text{if } |C_{ch\_obj} - C_{med}| \leq Th_C. \tag{Eq. 6}$$

In an alternative embodiment, a Pixel Contrast Value (PCV) is used to determine whether the contrast criterion is satisfied for each of the character objects. The pixel contrast value (PCV) is defined as a number representing the grayscale color of the given pixel relative to pixels in the neighborhood of the given pixel. In this embodiment, the Pixel Contrast Value is computed in accordance with the following equation:

$$PCV = C - [(Max - Min)/2] \tag{Eq. 7}$$

where Min and Max are respectively the minimum and maximum pixel grayscale values in the neighborhood of the given pixel, and C is grayscale value of the given pixel color. In this embodiment, the neighborhood of the pixel under consideration may be defined as those pixels surrounding the pixel under consideration, and the contrast of a given character object may simply be defined as the mean of the PCV values corresponding to the "blob" representing the character object. (i.e., the mean of the PCV values of the interconnected foreground pixels). The compatibility between the contrasts of the character objects may then be determined in the same manner as that described above with respect to equation 6, where the contrast criterion is satisfied if, for each of the character objects of a potential candidate string object, the contrast of the character object differs from the median contrast by less than a given threshold.

Figure 10:
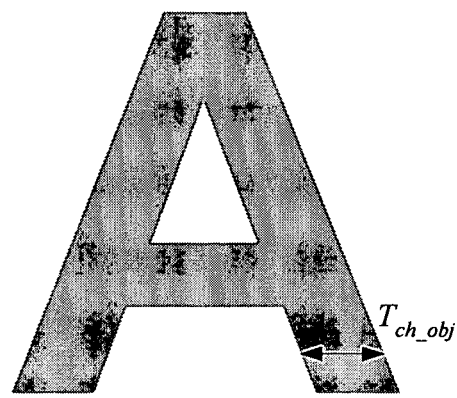
FIG. 10 illustrates the manner in which thickness criteria may be applied in accordance with embodiments of the present invention.

In accordance with one embodiment of the present invention, thickness criterion may also be used to identify whether a sequence of one or more character objects satisfies the criteria for a candidate string object. For example, in one embodiment, the maximum thickness (e.g., the stroke width) $T_{ch\_obj}$ of each of the character objects in a potential string object may be determined in a manner such as depicted in FIG. 10, and then a median thickness of each of the character objects of the potential candidate string object may be determined from the thickness of each of the character objects. For example, referring to FIG. 10, the maximum thickness is illustrated for the character A having a relatively constant thickness. The thickness criterion may be satisfied if, for each of the character objects forming the potential candidate string object, the thickness of the character object differs from the median thickness by less than a given threshold, i.e.

$$\text{if } |T_{set} - T_{med}| \leq Th_T \quad \text{(Eq. 8)}$$

Although thickness criterion may be used to further identify whether a sequence of one or more character objects corresponds to a candidate string object, Applicants have empirically determined that thickness criterion is not needed in many implementations.

Other criteria that may be applied in act 430 to identify whether a sequence of one or more characters is a candidate string object may include non-encompassment criterion. In one embodiment, a first character object of a potential string object is said to encompass a second character object if (1) the range of ordinates (y-projections) of the character objects overlap and (2) the range of abscissas (x-projections) of the first character object enclose the range of abscissas of the second. It should be appreciated that criterion (1) is automatically satisfied if the previously mentioned alignment criterion described with respect to act 420 is satisfied.

Other criteria that may be applied in act 430 may include inter-character spacing criterion. In one embodiment, the space between each pair of consecutive character objects is determined and a determination is made as to whether that space is smaller than a maximum spacing parameter. This maximum spacing parameter may be determined using the width of a character object of the string object, the class of the corresponding character of the string, and a predetermined width factor which relates the width of a space to that of a character of that class. Width factors are described in greater detail below in the discussion of character size criterion.

Still further criteria that may be applied in act 430 to identify whether a sequence of one or more character objects is a candidate string object may include criteria relating more specifically to the user string received as input in act 410, such as aspect ratio criterion and character size criterion. For example, based upon use of the database described previously, each character a of the alphabet may be considered to have an associated range $[A_{min}(a), A_{max}(a)]$ that defines the minimum and maximum allowable aspect ratios for an occurrence of character a. The aspect ratio criterion for determining whether a sequence of character objects is a candidate string object is satisfied when the aspect ratio of each character object of the potential string object belong to the range of aspect ratios $[A_{min}( ), A_{max}( )]$ associated with the respective character of the user string.

In addition to aspect ratio criterion, character size criterion may also be considered in act 430, based upon the corresponding characters in the received user string. For example, in one embodiment, the determination of whether two character objects have compatible sizes considers the particular characters in the input user string they are supposed to represent. The character size criterion asks the question: "If the first string character object with dimensions $(w_1, h_1)$ represents an 'A' and the second string character object with dimensions $(w_2, h_2)$ represents a 'B', would these two character objects have compatible sizes?" For example, to be size-compatible with a character object representing an 'A', a character object representing a 'B' would be expected to have similar dimensions, while a character object representing an 'a' would be expected to have smaller dimensions. The character size criterion again references a database that contains characteristics of various alphabets, for example, the modern Latin alphabet database described previously. In the database, each character a of the alphabet is attributed a minimum width factor $k_{W\_min}(a)$ and a maximum width factor $k_{W\_max}(a)$. The width factors of all characters of the alphabet are determined according to a common reference width. For example, consider a first pair (user string character/character object) that includes a user string character a with width factors $k_{W\_min}(a)$ and $k_{W\_max}(a)$ and a character object having width $W_a$. Consider a second pair (user string character/character object) including a character b with width factors $k_{W\_min}(b)$ and $k_{W\_max}(b)$ and a character object having width $W_b$. The two pairs are width-compatible if:

$$\frac{k_{W\_min}(a)}{k_{W\_max}(b)} \leq \frac{w_a}{w_b} \leq \frac{k_{W\_max}(a)}{k_{W\_min}(b)} \quad \text{(Eq. 9)}$$

For two character objects to be size-compatible, the two characters should be compatible both in width according to equation 9 and in height according to an analogous equation. Thus, for a string object to satisfy the character size compatibility criterion and be classified as a candidate string object, every pair of character objects should satisfy the size compatibility criterion in width and in height.

Based upon the processing applied in acts 410-430, the routine has now identified a list of candidate string objects for the user string. It should be appreciated that in many implementations, one or more of the criteria described previously may be used to identify candidate string objects. For example, if the application of first criteria, such as alignment criterion, yields a large list of candidate string objects, additional criteria such as contrast criterion, non-encompassment criterion, and inter-character spacing criterion may be used to further limit the list. Alternatively, where a first criteria results in a manageable list of candidate string objects, fewer criteria may be applied.

Upon determining a list of candidate string objects in act 430, the routine proceeds to act 440. In act 440, a determination is made as to whether two or more candidate string objects in the list overlap (i.e., their bounding boxes overlap), and if so, both candidate string objects are removed from the list. The bounding box of a string object is a rectangle bounded on the left by the left-most pixel of the first character object, bounded on the right by the right-most pixel of the last character object, and bounded on the top and bottom by the highest pixel and lowest pixel, respectively, of the character objects of the string object.

After eliminating any overlapping candidate string objects in acts 440, the routine proceeds to act 450 wherein a determination is made as to which candidate string object has the highest string score. In accordance with one embodiment of the present invention, if it is determined that there is only a single candidate string object remaining in the list, then that string object is selected as a "match" for the user string. Alternatively, if there is more than one candidate string object in the list, the candidate string object having the highest "string score" is selected. In one embodiment, the determination as to which candidate string object has the highest score is determined in the following manner, based upon the contrast of the candidate string objects. In this embodiment, the contrast of a string object, $C_{str\_obj}$, is defined as the average of the contrasts of the character objects forming the string object:

$$C_{str\_obj} = \frac{1}{N} \sum_{i=1}^{N} C_{ch\_obj}(i)$$ (Eq. 10)

where N is the number of character objects in the string object and $C_{ch\_obj}(i)$ is the contrast of the $i^{th}$ character object of the candidate string object. The contrast $C_{ch\_obj}$ of a character object was defined previously with reference to the discussion of contrast criterion in act 430.

It should be appreciated that rather than using contrast criterion to determine which candidate string object has the highest score, other criteria may be considered. For example, each of the criteria applied in act 430 may be accorded a weight, and a score may be kept for each candidate string object to later identify which of the candidate string objects has the highest score. Thus, for example, rather than applying string object criteria in act 430 to successively narrow the list of candidate string objects, each type of criteria may have a weight (which may vary). By according each type of criteria a weight, the failure of a string object to meet a specific type of criteria may not result in that string object being eliminated from the list of candidate string objects. However, those string object that fail to meet a number of different criteria would ultimately be accorded a lesser weight, such that only those string objects having the highest weight would remain on the list. The contrast criterion described with reference to act 450 could also be accorded a weight, and then the candidate string object with the highest score selected as the "match" for the user string.

After determining the best match for the user string in act 450, the font definition routine proceeds to act 460, wherein model characters are defined. In act 460, a model character is defined for the $i^{th}$ character of the user string based upon the $i^{th}$ character object of the candidate string object selected in act 450. In one embodiment, the model character is simply defined as the character object itself: the group of connected foreground pixels resulting from the binarization step (FIG. 4, step 410). Alternatively, in another embodiment, a different approach is used. In this embodiment, the region of the original grayscale image provided to the font definition routine in act 410 is re-binarized, and the model character is defined from the resulting re-binarized character object. For example, the region of the original grayscale image may be selected to be slightly larger than the bounding box of the character object, and the binarization may be performed using locally optimal thresholding techniques that account for the particular condition is that region of the image (e.g., brightness, contrast, etc.).

FIG. 8 illustrates a set of model characters generated by a font definition routine in accordance with the present invention that is based upon the image depicted in FIG. 6 and the strings "abcd" and "1234" provided by a user, and illustrated in FIG. 7. As can be seen from FIG. 8, character 810 of the user string corresponds to a unique model character 820 defined from the user string and the image.

Figure 5:
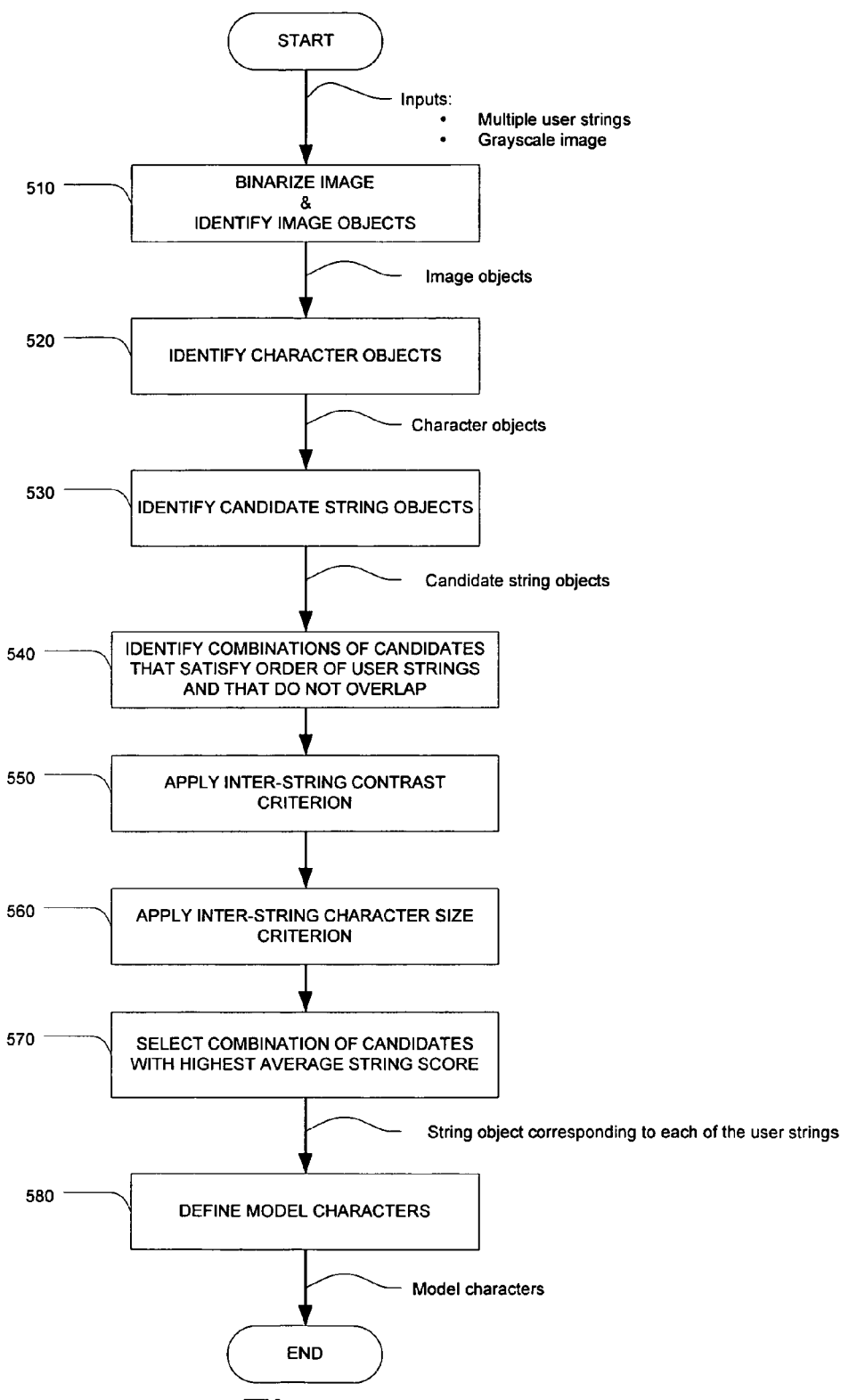
FIG. 5 illustrates another font definition routine in accordance with another embodiment of the present invention.

In accordance with another embodiment of the present invention, a font definition routine that is adapted to receive multiple user strings is now described with respect to FIG. 5. As many of the acts performed by the font definition routine of this embodiment are similar to acts described previously in detail with respect to the embodiment of FIG. 4, in the interest of brevity, only the differences are described in detail herein.

In act 510, the font definition routine receives, as input, a plurality of user strings and an image containing an occurrence of each of the plurality of user strings. The font definition routine binarizes the image and identifies and isolates image objects contained in the image based upon interconnected pixels having the same binary value. This is done in a manner similar to that described above with respect to FIG. 4. As in the previous embodiment described with respect to FIG. 4, the image may be binarized based upon local thresholding techniques or based upon global thresholding techniques.

In act 520, the font definition routine identifies character objects based upon the image objects identified in act 510. In the font definition routine of FIG. 5, a character object is an image object that is likely to be an occurrence of a character of any one of the plurality of user strings based on certain criteria relating to characters, rather than other types of image objects. Criteria that are used to identify whether an image object is a character object may again include size criterion and aspect ratio criterion. However, in contrast to the embodiment described previously with respect to FIG. 4, for the size criterion, the maximum allowable width $W_{max}$ of a character object is determined in accordance with equations 2 and 3 using a length N of the longest user string of the plurality of user strings received in act 510. The use of a length N of the longest user string assumes that all relevant characters in the image are of approximately the same size, even if they belong to different strings, which in empirical tests, is a reasonable assumption. It should be appreciated that other size criterion may be used, provided that the criterion selected has some empirical basis.

For the aspect ratio criterion, the range $[A_{min}, A_{max}]$ of allowable aspect ratios for a character object may determined based on the range $[A_{min}(a), A_{max}(a)]$ of each character a of each of the user strings in a manner analogous to that described previously with respect to FIG. 4. It should be appreciated that other criteria, such as "characterness" criterion may additionally be applied in act 520 to identify whether the image object is likely to be a character object.

In act 530, candidate string objects are identified for each of the received user strings in a manner analogous to that described previously with respect to act 430 in FIG. 4. As a result, the routine has a list of candidate string objects, each having a "user string number" indicating which of the plurality of received user strings for which it is a candidate.

In act 540 the font definition routine identifies combinations of candidate string objects that satisfy certain criteria, such as the order in which the user strings were provided, and whether a candidate string object overlaps with another candidate string object. In one embodiment, the font definition routine assumes that the order in which the user strings are received by the routine corresponds to the order in which the strings appear in the received image. For example, where it may be assumed that characters are generally read from left to right and from top to bottom, the routine may assume that this is the same order in which the strings appear in the received image. Where the routine is used in a different environment, for example, where characters are generally read from right to left, top to bottom, a different order may be assumed. Thus, in act 540, the font definition routine determines which candidate string objects respect the order in which the user string were provided to the routine, and also determines which, if any, of the candidate string object overlap one another.

Figure 11:
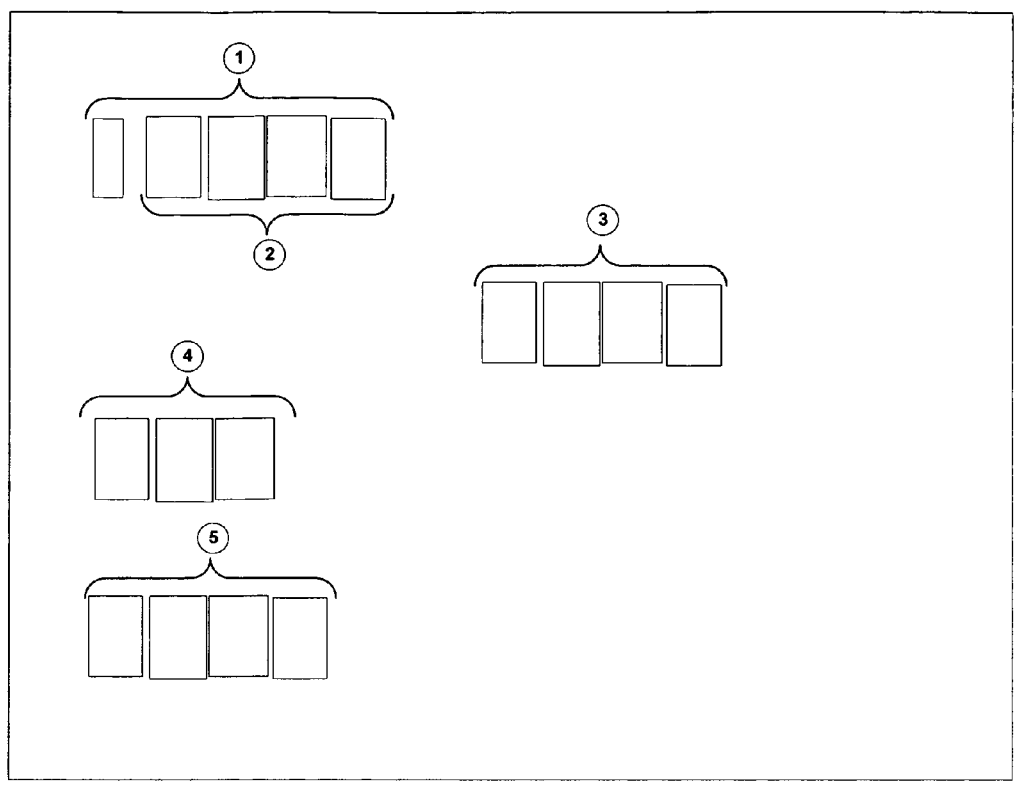
FIG. 11 depicts an image that contains a number of occurrences of user strings upon which model definition may be performed.

For example, consider the user strings '12345', '6789', and 'XYZ' and the image illustrated in FIG. 11. This image contains 5 candidate string objects: candidate 1 is a candidate for the user string '12345', candidates 2, 3, and 5 are candidates for the user string '6789', and candidate 4 is a candidate for the user string 'XYZ'. If the routine was provided with the user strings in the order '12345', '6789', 'XYZ', the determination made in act 540 would return the combination of candidate strings (1, 3, 4). It should be noted that candidate strings (1, 2, 4) also satisfies the order in which the user strings were provided to the routine, but candidate strings 1 and 2 overlap. It should be appreciated that the rules used to determine the order of string objects in an image are not important, provided the user uses the same rules when entering the user strings.

After determining which of the candidate string objects satisfy the criteria described above with respect to act 540, the font definition routine proceeds to act 550, wherein an inter-string contrast criterion is applied to each of the combinations of candidate string objects determined in act 540, and combinations of candidate string objects that do not meet the inter-string contrast criterion are removed. For each combination of candidate string objects, the routine determines whether the candidate string objects of the combination have compatible string contrasts. In one embodiment, this involves determining whether the following relation holds:

$$\frac{C_{str\_max}}{C_{str\_min}} \leq Th \qquad \text{(Eq. 11)}$$

where $C_{str\_min}$ and $C_{str\_max}$ are the minimum and maximum string contrasts among the string objects of the combination and Th is a pre-determined threshold value. The contrast $C_{str\_obj}$ of a string object was described previously with reference to FIG. 4, act 450.

In act 560, inter-string character size criterion is applied to each of the remaining combinations of candidate string objects, and a determination is made as to which of the remaining combinations of candidate string objects meet the inter-string character size criterion. For each combination, the routine determines whether all the character objects of all the string objects of the combination have compatible sizes. In one embodiment, this determination is performed using a similar method to that described with respect to act 430 of FIG. 4 relating to the character size criterion.

In act 570, a determination is made as to which of the combinations of candidate string objects has the highest string score. For example, in act 570, if there is a single combination of candidate string objects remaining, this combination is selected as a "match" for the sequence of user strings. Otherwise, the combination of candidate string objects having the highest "average string score" is selected. In accordance with one embodiment, the average string score of a combination of candidate string objects is given by:

$$S_{str\_avr} = \frac{1}{N_s} \sum_{i=1}^{N_s} S_{str\_obj}(i) \qquad \text{(Eq. 12)}$$

where $N_s$ is the number of user strings and $S_{str\_obj}(i)$ is the string score of the $i^{th}$ candidate string object of the combination. In one embodiment, the string score $S_{str\_obj}$ is the string contrast $C_{str\_obj}$ described previously with respect to act 450 and FIG. 4.

Based upon the determination made in act 570, each user string has a corresponding matching string object. Accordingly, in act 580, and for each of the user strings, a model character is defined for the $i^{th}$ character of the user string from the $i^{th}$ character object of the corresponding string object in a manner analogous to that described previously with respect to act 460 of FIG. 4.

It should be appreciated that numerous modifications may be made to the above-described font definition routines in accordance with the present invention. For example, in both the single user string font definition routine of FIG. 4 and the multiple user font definition routine of FIG. 5, the routine may be unable to define a set of model characters. In many instances, this may be due to the fact that the image was poorly binarized in act 410 of FIG. 4, or act 510 in FIG. 5. Thus, if the routine is unable to define model characters in acts 460 or 580, or if there is no candidate string object or combination of candidate string objects having a highest score, the routine may re-binarize the image using different thresholding techniques. For example, different images may necessitate different thresholding techniques (e.g., global, local) and different parameter settings within a particular thresholding technique (e.g., threshold value, window size). Accordingly, the font definition routines of the present invention may attempt model definition on an image using a series of different thresholding techniques and parameter settings, until the model definition process is successful. For example, and referring to FIG. 4, if a first thresholding technique is selected in act 410, and model definition is attempted and is not successful on the thresholded image according to acts 420 to 460, different thresholding techniques or different parameter settings may be selected, and acts 420 to 460 repeated on the new thresholded image. This process may be repeated until the model definition process is successful.

Similarly, it should be appreciated that embodiments of the present invention may be used with marked or multi-component characters, and well as unmarked or single component characters. As known to those skilled in the art, a marked or multi-component character is composed of a main portion and one or more secondary portions (the marks). Examples of marked or multi-component characters include characters with dots (e.g. i, j), accents (e.g. é, ê, À), umlauts (e.g. ü), cedillas (e.g. ç), and other marks (e.g. ?, !). Support for these characters may be provided by defining mark attributes for the characters of an alphabet.

For example, characters of an alphabet may have one of four different mark attributes including characters having no mark, characters having a mark above a main portion of the character, characters having a mark below the main portion of the character, and characters having an unknown mark. Thus, for example, in act 460 of FIG. 4, or in act 580 of FIG. 5, prior to defining a model character for a character of a user string from a character object of the image, the mark attribute of the character may be examined. If the character has a "Mark above" (respectively, "Mark below") attribute, the area above (respectively, below) the character object in the original binarized image may be searched for additional objects. The size of the area to be searched can be expected to be proportional to the size of the character object. If alternatively, the character has a "Mark unknown" attribute, both the areas above and below the character object in the original binarized image may be searched. Thus, a model character may be defined for a marked character as the combination of the character object and any additional object(s) found in the searched area(s).

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the scope of the invention. Accordingly, the foregoing description and drawings are by way of example only.

What is claimed is:

1. A non-transitory computer readable medium encoded with a plurality of instructions that when executed by at least one processor implements a method of defining model characters of a font, the method comprising acts of:
    a) receiving a first input comprising a string of characters input by a user, each character of the string having an associated range for a feature value that is derived from the shape of the character and does not vary with the size of the character;
    b) receiving a second input comprising an image including an occurrence of the string of characters;
    c) isolating objects in the image by grouping connected foreground pixels;
    d) identifying, among the isolated objects, objects that meet a character size criterion determined adaptively based upon the image and the particular string input by the user;
    e) identifying, among the identified objects, a sequence of objects corresponding to the string of characters (1) based upon a comparison of a feature value of each object of the sequence of objects and the range associated with the corresponding character of the string, and (2) by applying a string criterion, specific to the particular string input by the user, requiring that each pair of objects in the sequence of objects have compatible dimensions given the corresponding pair of characters of the string they are supposed to represent; and
    f) creating a model character of the font for each character of the string of characters based upon the corresponding object of the sequence of objects.

2. The computer readable medium of claim 1, wherein the act (e) includes an act of comparing an aspect ratio of the object with a range of aspect ratios associated with the corresponding character of the string.

3. The computer readable medium of claim 1, wherein the sequence of objects includes a pair of objects, and wherein the act (e) includes acts of determining a dimension ratio between the pair of objects and comparing the dimension ratio with a range of dimension ratios associated with the corresponding pair of characters of the string.

4. The computer readable medium of claim 3, wherein the act of determining the dimension ratio between the pair of objects includes acts of:
    a) accessing a database that includes information characterizing a range of at least one dimension of each character of the string relative to a corresponding reference dimension;
    b) determining a ratio of the at least one dimension of a first object of the pair of objects relative to the at least one dimension of a next object of the pair of objects;
    c) comparing whether the ratio of the at least one dimension of the first object of the pair of objects relative to the at least one dimension of the next object of the pair of objects is within the range of the at least one dimension.

5. The computer readable medium of claim 1, wherein the act (e) further includes an act of:
    determining whether each object of the sequence of objects satisfies at least one string criteria.

6. The computer readable medium of claim 5, wherein the at least one string criteria includes an alignment criterion that identifies a degree to which objects of the sequence of objects are aligned.

7. The computer readable medium of claim 5, wherein the at least one string criteria includes a spacing criterion that identifies a degree to which pairs of objects of the sequence of objects are spaced apart.

8. The computer readable medium of claim 5, wherein the at least one string criteria includes a contrast criterion that identifies a degree to which each object of the sequence of objects corresponds to a median contrast of the sequence of objects.

9. The computer readable medium of claim 5, wherein the at least one string criteria includes a non-encompassment criterion that identifies whether a first object of the sequence of objects encompasses a next object of the sequence of objects.

10. The computer readable medium of claim 1, wherein the act (e) includes an act of:
    determining whether each object of the sequence of objects satisfies a plurality of string criteria.

11. The computer readable medium of claim 10, wherein the plurality of string criteria includes an alignment criterion that identifies a degree to which objects of the sequence of objects are aligned and at least one of:
    a spacing criterion that identifies a degree to which pairs of objects of the sequence of objects are spaced apart;
    a contrast criterion that identifies a degree to which each object of the sequence of objects corresponds to a median contrast of the sequence of objects; and
    a non-encompassment criterion that identifies whether a first object of the sequence of objects encompasses a next object of the sequence of objects.

12. The computer readable medium of claim 1, wherein the act (e) includes an act of identifying a plurality of sequences of objects corresponding to the string of characters based upon a comparison of at least one feature value of each object of each sequence of objects and a range of feature values associated with a corresponding character of the string, the method further comprising acts of:
    (g) determining, for each respective sequence of objects of the plurality of sequences of objects in which the at least one feature value of each object falls within the range of feature values associated with the corresponding character of the string, a score identifying a likelihood that the respective sequence of objects corresponds to the string of characters; and
    selecting the respective sequence of objects having a highest score as the sequence of objects from which to create the model character in act (f).

13. The computer readable medium of claim 12, wherein the score identifies a contrast of the respective sequence of objects.

14. The computer readable medium of claim 12, further comprising acts of:
   determining whether any one of the plurality of sequences of objects overlaps with another one of the plurality of sequences of objects; and
   discarding sequences of objects that overlap prior to the act (g).

15. The computer readable medium of claim 1, wherein the act of identifying objects that meet a character size criterion includes an act of determining an allowable dimension for each object representing a character adaptively based upon the image and the string of characters.

16. The computer readable medium of claim 15, wherein the act of determining the allowable dimension for each object includes an act of determining a maximum width for each object based upon a width of the image and a number of characters in the string of characters.

17. The computer readable medium of claim 15, wherein the act of determining the allowable dimension for each object includes an act of determining a minimum dimension for each object based upon a size of the image and a number of objects in the image.

18. The computer readable medium of claim 1, further comprising an act of:
   discarding objects that do not meet a characterness criterion indicative that the object is more likely to be a character object rather than another type of object prior to the act (e).

19. The computer readable medium of claim 18, wherein the characterness criterion includes a number of holes in the object.

20. The computer readable medium of claim 1, wherein the image is a first image, the method further comprising an act of:
   receiving a second image including an occurrence of a second string of characters; and
   identifying individual characters based upon the model characters created in act (f).

21. The computer readable medium of claim 1, wherein the associated ranges of feature values for each character of the string are equal to predetermined ranges assigned to a corresponding character of an alphabet.

22. The computer readable medium of claim 1, wherein the associated ranges of feature values for each character of the string are the ranges of a predetermined class to which the respective character of the string belongs.

23. The computer readable medium of claim 22, wherein the predetermined class is one of a first class containing narrow-width characters, a second class containing large-width uppercase characters, and a third class containing large-width lowercase characters.

* * * * *